United States Patent [19]

Meyer

[11] Patent Number: 4,491,215
[45] Date of Patent: Jan. 1, 1985

[54] PRESSURIZED EXPLOSION CONTAINING CONVEYOR

[75] Inventor: Hans J. Meyer, Ratingen, Fed. Rep. of Germany

[73] Assignee: Maschinenfabrik BESTA, Ratingen, Fed. Rep. of Germany

[21] Appl. No.: 415,250

[22] Filed: Sep. 7, 1982

[30] Foreign Application Priority Data

Sep. 18, 1981 [DE] Fed. Rep. of Germany ....... 3137190

[51] Int. Cl.$^3$ ............................................. B65G 21/00
[52] U.S. Cl. ..................................... 198/861; 198/735
[58] Field of Search ............... 198/860, 861, 735, 720, 198/561; 414/217

[56] References Cited

U.S. PATENT DOCUMENTS

| | | | |
|---|---|---|---|
| 2,926,802 | 3/1960 | Stuewer | 414/217 X |
| 3,187,944 | 6/1965 | Stock | |
| 4,056,185 | 11/1977 | Cartwright | 198/598 X |
| 4,170,293 | 10/1979 | Campbell | 198/861 |

FOREIGN PATENT DOCUMENTS 2065586 11/1980 United Kingdom .

Primary Examiner—Joseph E. Valenza
Assistant Examiner—Dennis Williamson
Attorney, Agent, or Firm—Body, Vickers & Daniels

[57] ABSTRACT

A conveyor, e.g. for coal has a conveyor box and a cylindrical housing surrounding this conveyor box. The cavities between conveyor box and housing are sealed by bulkhead(s) in which burst plate(s) are present which seal the cavities dust-tightly, but are destroyed in the case of an explosion so that rapid pressure equalization can occur between the conveyor compartment and the cavities. Preferably there is an aperture with a dust-proof but not pressure tight seal between the cavities and the conveyor box, allowing pressure equalization in normal operation.

Advantageously the condition of the burst plate is monitored by suitable means.

8 Claims, 3 Drawing Figures

PRESSURIZED EXPLOSION CONTAINING CONVEYOR

BACKGROUND OF THE INVENTION

1. Field of the Invention

The invention relates to a conveyor, e.g. for coal, with a conveyor box and with a substantially cylindrical housing which is spaced from and surrounds the conveyor box.

When coal is fed to coal pulverisers for coal dust furnaces the conveyors used must have a pressure-tight housing in order to withstand not only the operating pressure, which is higher than the atmospheric pressure, but also the pressure of an explosion which may occur in the interior of the coal pulveriser and be propagated upstream into the conveyor.

2. Description of the Prior Art

In order to satisfy these requirements, a conveyor of the type described above is known (British Pat. No. 2065586) which has a cylindrical housing which surrounds the conveyor box and is spaced from it and wherein the gap between conveyor box and housing wall is packed with a fire-inhibiting plastic foam. This plastic foam is intended to transfer the internal pressure, which occurs when there is an explosion, uniformly to the cylindrical housing wall, which is in turn dimensioned so that it can withstand the explosion gas pressure.

It is doubtful in the case of the known apparatus whether the pressure is actually transmitted uniformly to the total cylindrical housing wall. Above all, however, it is disadvantageous that the trays and side walls of the conveyor, which suffer heavy wear, are connected to the plastic foam over their entire surfaces after the cavities have been foamed, and can then no longer easily be removed or exchanged. However, this removal is necessary because the side walls and trays of the conveyor box have a considerably shorter useful life than the housing surrounding the conveyor, due to corrosion and due to the wearing effect of the conveyor chains of the conveyor.

SUMMARY OF THE INVENTION

It is therefore the aim of the invention to enable the construction of a conveyor with pressure-tight housing of the type initially described above in such a way that, without restricting the explosion protection, the conveyor box with all its parts remains more readily accessible, while the penetration of dust into the cavity between housing and conveyor box is prevented.

Accordingly the invention provides a conveyor in which the cavities between conveyor box and housing are sealed dust-tightly from the conveyor compartment by at least one bulkhead with at least one burst plate disposed in the said bulkhead. The housing will normally be spaced from the conveyor box around most of the housing circumference, but at the top of the box its sides may run into the housing so that at some points the path followed by material being conveyed is closed jointly by the box and the housing. The bulkhead seals the cavities from the conveyor path to keep out dust.

In this way the cavities between housing wall and conveyor box can remain hollow, and the side walls and trays of the conveyor box can be demounted and exchanged at any time. In use the cavities are sealed dust-tightly, but in the case of an explosion the burst plate is immediately destroyed or displaced so that rapid pressure equalisation can occur between the conveyor compartment and the cavities between conveyor box and housing wall.

The side cavities between the cylindrical housing wall and the side walls of the conveyor box conveniently communicate with the bottom cavities between the housing wall and the trays of the conveyor box. Consequently an easier and faster propagation of pressure is possible in the case of an explosion.

In order to achieve a pressure equalisation in normal operation between the conveyor compartment and the cavities surrounding the latter between conveyor box and housing wall, it is advantageous to provide at least one dust-tightly, but not pressure-tightly, sealed aperture in the side walls of the conveyor box and/or in the bulkhead. In this way the penetration of dust through cracks and gaps from the conveyor compartment into the cavity between conveyor box and housing wall can be prevented.

The burst plate is conveniently a thin plate of sheet metal or plastic which is secured to the bulkhead with interposition of a ring seal. The apertures in the side walls of the conveyor box and/or in the bulkhead may be sealed by fabric filters or sintered filters.

Because minor detonations in the pulveriser or in the conveyor are not always noticed immediately, it is useful to associate with the burst plate a monitoring device which checks the condition of the burst plate and triggers an alarm or makes a visible signal which indicates any destruction or displacement of the burst plate to the personnel operating the installation.

For the same purpose, an inspection window, through which the burst plate can be observed, may be arranged in the housing wall at a point opposite the burst plate.

BRIEF INTRODUCTION OF THE DRAWINGS

Embodiments of the present invention, given by way of non-limitative example will now be described with reference to the accompanying drawings in which.

DESCRIPTION OF THE PREFERRED EMBODIMENTS

Figure 1:
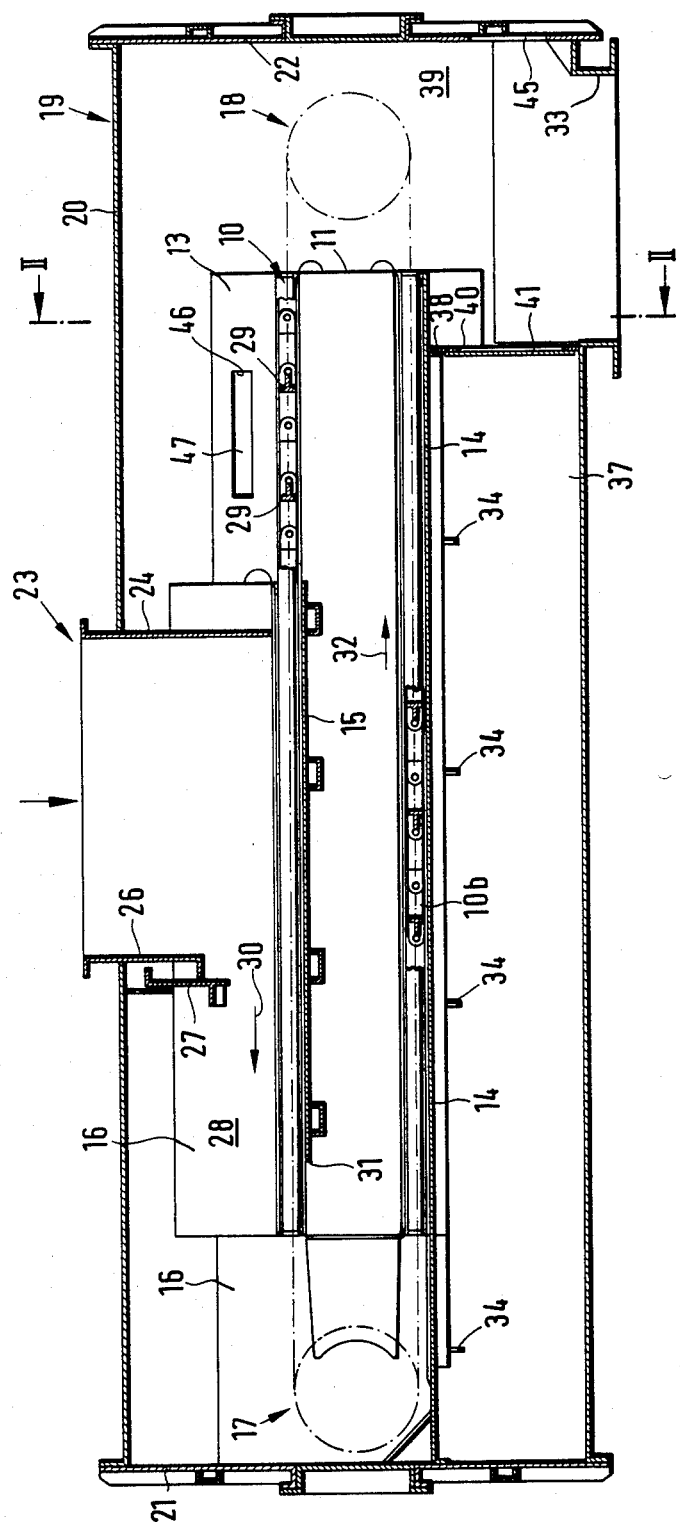
FIG. 1 shows a conveyor embodying the invention in longitudinal section.

A conveyor 10 is constructed as a double drag chain, or trough chain, conveyor and runs in a closed conveyor box 11. The conveyor box 11 has side walls 13 and 16, a base tray or lower conveyor table 14 and an intermediate tray or top conveyor table 15.

The conveyor box 11 with its conveyor 10, which serves, in the present exemplary embodiment, to feed coal to a pulveriser, is disposed together with its drive station 17 and its return station 18 in a cylindrical housing 19 which has a cylindrical outer wall 20 and is sealed at its end faces by end walls 21 and 22. The cylindrical housing 19 contains, approximately half way along it, an inlet aperture 23, which is connected to a bunker discharge, not shown in detail here. The lateral and rear walls 24 and 25 of the inlet aperture 23 extend into the conveyor box 11 and are connected dust-tightly and pressure-tightly to the side walls 13 of the latter. At the front wall 26 of the inlet 23, which terminates at a substantial distance from the intermediate tray 15, there is a layer height limiter 27 which is vertically adjustable. This determines the height of the layer of transported material withdrawn by the conveyor 10 from the inlet aperture 23.

The transported material 28 withdrawn by the conveyor 10 from the inlet aperture 23 is initially conveyed in the direction of the arrow 30 (to the left in FIG. 1) by the drags 29 of the conveyor 10 on the intermediate tray 15. It then falls through an aperture 31 in the conveyor tray 15 onto the bottom conveyor table 14, where it is conveyed by the lower side 10b of the drag chain conveyor in the opposite direction to the direction of the arrow 32 (to the right in FIG. 1), where at the end of the conveyor table 14 it is thrown into the discharge aperture 33, which is located at the right-hand end of the housing 19.

Figure 2:
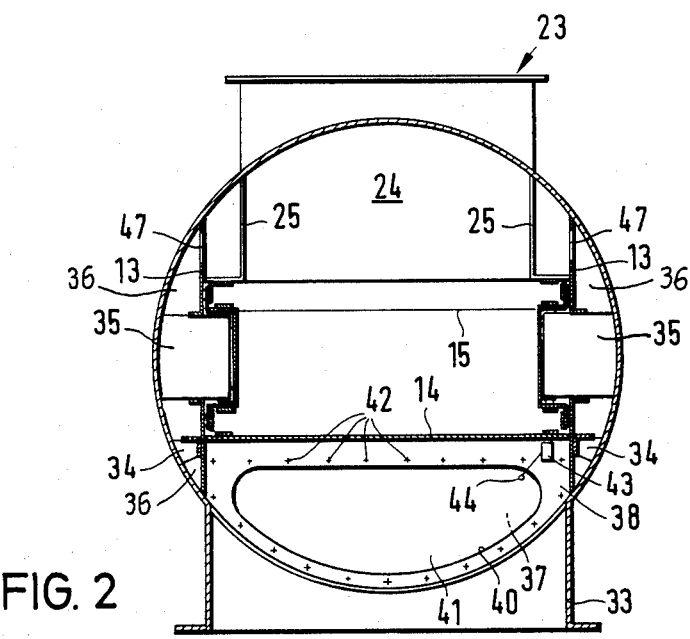
FIG. 2 shows the conveyor of FIG. 1 in a cross-section along the line II—II.

It will be seen from FIGS. 1 and 2 that the conveyor box 11 is supported with brackets 34 and support plates 35 by the cylindrical housing 19 which surrounds the conveyor box 11 at a slight distance. The resulting side cavities 36 and the bottom cavity 37 are sealed dust-tightly from the interior of the conveyor compartment 39 in the region of the discharge chute 33 by bulkheads, of which only the bulkhead 38 for the bottom cavity is visible in FIGS. 2 and 3.

The bulkhead 38 contains (in FIG. 2) a large semi-oval aperture 40, which is sealed by a burst plate 41 made of thin sheet metal approximately 0.4 mm thick. The burst plate 41 is secured dust-tightly to the edge of the aperture 40 by rivets or screws 42, so that no dust can penetrate from the conveyor compartment 39 into the bottom cavity 37.

A monitoring device 43, which is secured to the bulkhead 38, senses the burst plate 41 with a sensor 44, extensometer strip or the like, and triggers an acoustic or optical signal when the burst plate 41 is destroyed or becomes extraordinarily deformed.

An inspection window 45, through which the condition of the burst plate 41 can be observed, is disposed in the part of the end wall 22 opposite the burst plate 41.

Apertures 46, which are sealed by fabric filters or sintered filters 47, are conveniently provided in the side walls 13 and 16 of the conveyor box 11. The equalisation of the operating pressure between the interior of the conveyor box and the conveyor compartment 39 on the one hand, and the cavities 36, 37 between conveyor box 11 and housing 19 on the other hand, is possible through these filters 47, without the dust being able to penetrate from the conveyor compartment into the cavities between housing and conveyor box.

Figure 3:
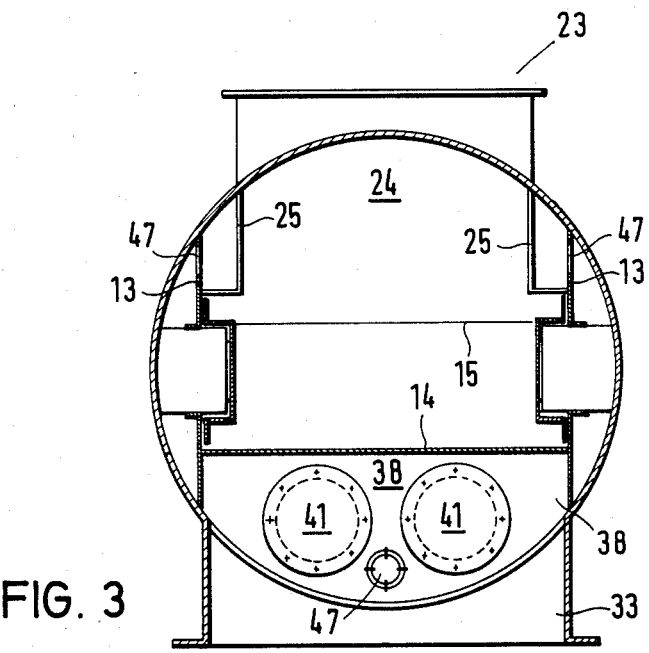
FIG. 3 shows a somewhat different embodiment of the invention in a cross-section corresponding to FIG. 2.

FIG. 3 illustrates a somewhat different embodiment, wherein two circular burst plates 41 are arranged in the bulkhead 38. Additionally, a sintered filter 47 is also present in the bulkhead 38 to equalise the operating pressure.

There are many other possible constructions embodying the present invention. For example, burst plates may also be arranged in the bulkheads sealing the side cavities 36, and it is also possible to provide monitoring devices at additional points. It is also possible to separate the side cavities between housing and conveyor chest from the bottom cavity, although it is normally more advantageous if the side cavities communicate with the bottom cavity. It is moreover also possible to arrange the front end wall 21 of the housing 19 at a spacing from the conveyor box, which is then also sealed at that end, and then to provide burst plates also in the end wall of the conveyor box in order to open the conveyor compartment immediately in the case of an explosion and bring it into communication with the surrounding cavities of the cylindrical housing. It is also possible to provide the cylindrical housing additionally with stiffening and reinforcing means, in order to increase its pressure retaining strength in the case of an explosion.

What is claimed is:

1. A conveyor for particulate matter comprising a pressure tight outer housing; a particulate matter inlet; a conveyance path; means conveying particulate matter along said conveyance path; a particulate matter outlet; at least one dust-tight bulkhead separating a first volume from a second dust-tight volume; said first volume comprising said particulate matter inlet, said conveyance path and said particulate matter outlet; said second dust-tight volume being fully contained within said pressure tight outer housing; and, at least one burst plate disposed in said bulkhead, said burst plate allowing the rapid passage of pressure and gas between said first volume and said second dust-tight volume when the pressure difference between said first volume and said second dust-tight volume exceeds a predetermined value.

2. The conveyor of claim 1 wherein said conveyance path and said conveying means are contained in a conveyor box within said first volume and said second dust-tight volume comprises the regions on each side of said conveyor box and below said conveyor box and all such regions are in communication with each other.

3. The conveyor of claim 2 having at least one aperture directly communicating the interior of said conveyor box and said second dust-tight volume, said aperture preventing the passage of dust but allowing the passage of pressure and gas.

4. The conveyor of claim 3 wherein said aperture is sealed by a fabric filter.

5. The conveyor of claim 3 wherein said aperture is sealed by a sintered filter.

6. The conveyor of claim 1 wherein said burst plate is a sheet metal plate approximately 0.4 millimeters thick.

7. The conveyor of claim 1 including means providing a signal when said burst plate is extraordinarily deformed or destroyed.

8. The conveyor of claim 1 wherein an inspection window is disposed in said outer housing so as to permit visual inspection of said burst plate.

* * * * *